United States Patent Office 3,043,353
Patented July 10, 1962

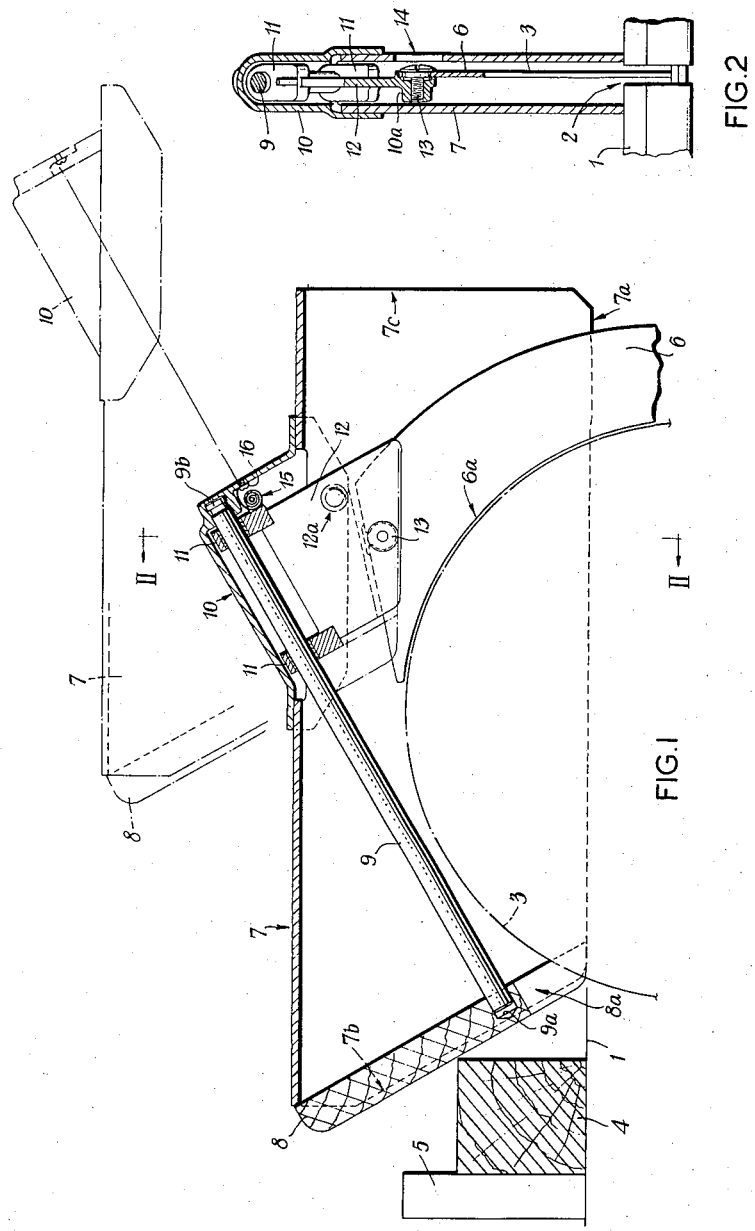

3,043,353
SAW GUARD FOR A CIRCULAR SAWING MACHINE
Theo Sherwen, Minchinhampton, and Leonard Gordon Taylor, Corsham, England, assignors to Horstmann & Sherwen Limited, Corsham, England, a company of Great Britain
Filed Nov. 4, 1959, Ser. No. 850,866
Claims priority, application Great Britain Nov. 10, 1958
2 Claims. (Cl. 143—159)

This invention relates to circular sawing machines of the kind having a rotary saw blade which is mounted beneath a work table to project above the work supporting table top, and is mainly concerned with ensuring maximum protection for an operative using such a machine.

According to one aspect of the invention there is provided a circular sawing machine of the kind specified having a saw guard shaped to encase the projecting part of the saw blade and mounted for rearward and upward sliding movement, in relation to the operative edge part of the saw blade, on a non-rotary part of the machine, the arrangement being such that, when the saw and a workpiece approach one another for a cutting operation, the workpiece will abut an end of the guard and push the latter upwardly and rearwardly into a position in which the workpiece can pass under the guard.

According to a further aspect of the invention, the saw guard includes an inverted channel-section body with side walls disposable on opposite sides of the projecting part of the blade and an end nose disposable in front of the blade cutting edge, and a spring influenced slide mounting for operatively locating the said body on a non-rotary part of the machine in such manner that the body normally will occupy a rest position encasing the blade whilst pressure on the body nose from a work-piece approaching the saw will cause the body progressively to slide rearwardly and upwardly, against said spring influence, into a position in which the workpiece can pass thereunder whilst the saw passes through the workpiece.

In order that the invention may be clearly understood and readily carried into effect, an embodiment thereof will now be described in detail with reference to the accompanying drawings in which:

FIGURE 1 is a side sectional view showing a saw guard of the invention in operative association with the relative part of a circular sawing machine, part of the guard being also shown in a retracted position in chain-dotted lines, and FIGURE 2 is a cross-section on the line II—II of FIGURE 1.

Referring now to the drawings, a saw guard of the invention is applied to a circular sawing machine having a flat work table 1 supported on a frame (not shown) and provided with an elongated slot 2 through which part of a rotary circular saw blade 3 projects above the work supporting top of the table 1. The saw blade 3 may be mounted, in well known manner, on a slidable carriage beneath the table top whereby the projecting blade part can be drawn along the aforesaid slot 2 to cut a workpiece 4 located against a fence 5 on the table top. A riving knife 6 is also secured on the carriage in trailing coplanar relationship to the saw blade 3, and projects through the slot 2 in the work table immediately behind the blade. This riving knife 6, which does not rotate with the saw blade, has its leading edge 6a shaped to follow the projecting part of the blade periphery through approximately 90°, the top of the knife being extended slightly above the projecting part of the saw blade.

The saw guard has an inverted channel-section body 7 with flat spaced substantially parallel side walls which encase the projecting parts of the saw blade 3 and riving knife 6 when the body is located in the inverted rest position on the table top, as shown in full lines in FIGURE 1 of the drawings. When thus positioned the free edges 7a of the body side walls can lie flat on the table top on opposite sides of the saw blade and riving knife, the depth of the walls being sufficient to provide a clearance between the tops of the blade and the knife and the inverted base of the body. The length of the body walls is such that, when the body is in the aforesaid rest position, the leading or front end edges 7b of the walls project slightly beyond the leading cutting edge of the projecting saw part whilst the rear end edges 7c of the walls project beyond the back of the riving knife.

The rear edges 7c of the body walls may be substantially perpendicular to the free wall edges 7a, as shown, so as to lie at right angles to the table top when the free edges rest on the top as aforesaid. The front or leading end edges 7b of the walls are, however, shaped to form an acute angle with the inverted body base so that these leading edges incline rearwardly towards the cutting edge of the saw blade in the downward direction. Secured between the back-sloping front wall edges 7b of the body is a replaceable nose member 8 which serves to close off the front body end. This nose member may be in the form of a wooden strip which is net parallel to the aforesaid leading edges and has a longitudinal slot 8a at the lower end to clear the cutting edge of the saw blade.

The guard body is supported in position over the saw blade 3 and riving knife 6 by a slide mounting in the form of a slide and slideway which is arranged to enable the body to slide upwardly and rearwardly in relation to the operative edge part of the saw blade. The slide is constituted by a circular-section rod 9 which is carried between the body walls and extends at approximately 90° to the nose from a lower attachment point 9a, located just above the lower slotted nose end, to an upper attachment point 9b provided within a humped casing 10 which straddles an opening, through which the upper rod end passes, in the inverted base of the channel section body 7 at a location above the top of the riving knife 6. The slideway is provided by a pair of axially aligned lugs 11 which slidably engage around the aforesaid rod and are mounted on one edge of a bracket plate 12 which is secured by a screw 13 to the top of the riving knife 6 between the body walls. To this end the screw 13 is arranged to pass through an aperture provided in the riving knife 6 and to screw into a boss 10a on the bracket plate, as shown in FIGURE 2. To enable the screw 13 to be manipulated, a hole 14 is provided in one side wall of the channel section body 7 to lie opposite the screw head when the body is in the rest position. A clockwork type linear spring 15 is mounted on the rear upper corner of bracket plate 12 and has one end attached by a screw 16 to the rear wall of the humped casing 10 as shown.

The guard body 7 conveniently has the side walls and inverted base made of a transparent synthetic material so that it will interfere to a minimum extent with observation of the work in progress. The humped casing 10 may conveniently also be made from a similar material. Lateral bosses 12a are provided on the bracket plate 12 and slidably bear against the respective guard body side walls to prevent the guard tilting sideways.

In the use of the saw guard as described, the saw blade 3 will be fully protected when the machine is out of use since it will be enclosed by the side walls and front nose of the guard. If then it is desired to carry out a sawing operation, it is necessary merely to locate the workpiece 4 to be cut on the table top, in the desired relationship to the saw slot, and then to displace the saw carriage towards the workpiece. When thus displaced the nose 8 of the guard will first meet the workpiece and, as a result, the guard will be pushed by the workpiece both rearwardly and upwardly owing to the disposition of the slide rod 9 in its slideway. As the saw blade 3 continues to approach the workpiece, the guard will eventually be pushed above the level of the workpiece and the latter will then pass underneath the guard whilst the saw passes through the workpiece. The rearward and upward movement of the guard will be effected against the influence of the spring 15 so that, when the workpiece is withdrawn from beneath the lower guard edges, the latter will be automatically returned to the encasing position of rest.

The saw guard of the invention is, of course, equally applicable when the machine is used for ripping, the workpiece being then moved into the saw and again acting to lift the guard by abutting the guard nose.

We claim:

1. For use in a circular sawing machine having a rotary saw blade projecting upwardly through a slot in a work table, a saw guard including an inverted channel-section body the side walls of which are disposable on opposite sides of the projecting blade part, an end nose on the body which is disposable in front of the blade cutting edge, a slide rod mounted lengthwise between said body walls to incline upwardly and rearwardly from said nose, a slideway for said slide rod attachable to a non-rotary part of the machine, and spring means for urging said body into a rest position encasing the blade, from which position the body can be slid rearwardly and upwardly by pressure of a workpiece on said nose, said end nose of the guard body forming an acute angle with the inverted body base, so as to incline rearwardly towards the cutting edge of the saw blade in the downward direction, and being constituted by a replaceable nose member which is secured between the front edges of the body side walls to close off the front body end, the said member being longitudinally slotted at the lower end to clear the operative cutting edge part of the saw blade, the slide rod being of circular-section and extending at approximately ninety degrees to the nose from a lower attachment point located just above the lower nose end to an upper attachment point within a humped casing which straddles an opening, through which the upper rod end passes, in the inverted base of the channel body and the slideway being provided by lugs on a bracket plate.

2. A saw guard as claimed in claim 1 in which said spring means is provided by a clockwork type linear spring which is connectible between said guard body and said non-rotary part of the machine.

References Cited in the file of this patent

UNITED STATES PATENTS

| | | |
|---|---|---|
| 247,558 | Groff | Sept. 27, 1881 |
| 298,293 | Dalby | May 6, 1884 |
| 399,900 | Hoyt | Mar. 19, 1889 |
| 1,037,843 | Ackley | Sept. 10, 1912 |
| 1,258,961 | Tattersall | Mar. 12, 1918 |
| 1,720,535 | Wold | July 9, 1929 |
| 2,106,321 | Guertin | Jan. 25, 1938 |
| 2,731,049 | Akin | Jan. 17, 1956 |
| 2,876,810 | Peterson et al. | Mar. 10, 1959 |